United States Patent
Joch et al.

(10) Patent No.: US 10,601,869 B2
(45) Date of Patent: Mar. 24, 2020

(54) SYSTEM AND METHOD TO ESTIMATE QUALITY OF EXPERIENCE FOR CONSUMPTION OF ENCRYPTED MEDIA NETWORK TRAFFIC

(71) Applicant: NetScout Systems Texas, LLC, Plano, TX (US)

(72) Inventors: Anthony P. Joch, Waterloo (CA); Craig Radcliffe, Waterloo (CA); Stephan Toivonen, Waterloo (CA); Daniel Eble, Kitchener (CA); Mark Korhonen, Kitchener (CA)

(73) Assignee: NetScout Systems Texas, LLC, Plano, TX (US)

(*) Notice: Subject to any disclaimer, the term of this patent is extended or adjusted under 35 U.S.C. 154(b) by 341 days.

(21) Appl. No.: 15/433,847

(22) Filed: Feb. 15, 2017

(65) Prior Publication Data

US 2017/0237777 A1 Aug. 17, 2017

Related U.S. Application Data

(60) Provisional application No. 62/295,193, filed on Feb. 15, 2016.

(51) Int. Cl.
*H04L 29/06* (2006.01)
*H04L 12/24* (2006.01)

(52) U.S. Cl.
CPC ........ *H04L 63/168* (2013.01); *H04L 41/5009* (2013.01); *H04L 41/5067* (2013.01); *H04L 63/062* (2013.01); *H04L 63/1408* (2013.01)

(58) Field of Classification Search
CPC .. H04L 63/168; H04L 63/062; H04L 41/5009
USPC ......................................................... 713/152
See application file for complete search history.

(56) References Cited

U.S. PATENT DOCUMENTS

| | | | |
|---|---|---|---|
| 8,351,344 B2* | 1/2013 | Jung ................... | H04L 41/5009 370/252 |
| 8,897,144 B2* | 11/2014 | Hui ....................... | H04L 65/605 370/241 |
| 9,032,427 B2 | 5/2015 | Gallant et al. | |
| 9,037,743 B2 | 5/2015 | Kordasiewicz et al. | |
| 9,178,633 B2 | 11/2015 | Kordasiewicz et al. | |
| 9,479,562 B2* | 10/2016 | Funge .................... | H04L 65/80 |
| 2003/0200175 A1* | 10/2003 | Wang .................... | G06Q 20/10 705/50 |
| 2009/0034426 A1* | 2/2009 | Luft .................... | H04L 41/5009 370/252 |

(Continued)

*Primary Examiner* — Shin-Hon (Eric) Chen
*Assistant Examiner* — Dereena T Cattungal
(74) *Attorney, Agent, or Firm* — Locke Lord LLP; Scott D. Wofsy; Christopher J. Capelli

(57) ABSTRACT

A system and method is provided for analyzing media traffic having encrypted application-layer and payload data. The method includes determining from network traffic a media service provided to a network subscriber, application-layer and payload data of the network traffic providing the media service to the network subscriber being encrypted, detecting media traffic within the network traffic providing the media service to the network subscriber, associating application-layer data of the media traffic to a media session, determining a key performance indicator (KPI) associated with the media session, and outputting report data based on the KPI.

17 Claims, 8 Drawing Sheets

(56) References Cited

U.S. PATENT DOCUMENTS

| | | | |
|---|---|---|---|
| 2012/0110167 A1 | 5/2012 | Joch et al. | |
| 2012/0311126 A1* | 12/2012 | Jadallah | H04L 41/5067 |
| | | | 709/224 |
| 2013/0067109 A1* | 3/2013 | Dong | H04L 65/4069 |
| | | | 709/231 |
| 2013/0275552 A1* | 10/2013 | Dhesikan | G06F 9/452 |
| | | | 709/217 |
| 2014/0233479 A1* | 8/2014 | Dahod | H04W 76/27 |
| | | | 370/329 |
| 2015/0039680 A1* | 2/2015 | Gallant | H04L 65/60 |
| | | | 709/203 |
| 2016/0323201 A1* | 11/2016 | Choen | G06F 16/95 |

* cited by examiner

SYSTEM AND METHOD TO ESTIMATE QUALITY OF EXPERIENCE FOR CONSUMPTION OF ENCRYPTED MEDIA NETWORK TRAFFIC

CROSS REFERENCE TO RELATED APPLICATIONS

This application claims priority to U.S. Patent Application Ser. No. 62/295,193 filed Feb. 15, 2016 which is incorporated herein by reference in its entirety.

FIELD OF THE INVENTION

The present technology relates to network monitoring and, more particularly, methods and system estimate quality of experience (QoE) for consumption of encrypted media network traffic.

BACKGROUND OF THE INVENTION

Media traffic, including audio and/or video streams, represents a large proportion, often more than half, of total traffic traversing data networks. The value of estimating quality of experience (QoE) of media sessions are well documented (see, for example, U.S. Pat. Nos. 9,178,633; 9,032,427; 9,037,743; 9,485,298, all assigned to NetScout Systems, Inc. of Westford, Mass.).

In recent years, there has been a dramatic rise in the use of transport layer security (TLS) in the delivery of media content over the Internet. This increase has generally been in response to concerns over the control of content delivery. Media services, such as YouTube® and Netflix®, are concerned about traffic management practices employed by network owners such as Internet providers using data without permission. These media services have increasingly turned to TLS encryption as a means to thwart traffic management methods that make use of data from the application-layer protocol and/or media payload.

The use of TLS encryption in streaming media delivery impedes conventional methods used to determine QoE of streamed media provided by such media services and to perform tasks that use QoE determinations, such as media traffic management.

While such conventional methods and systems for determining QoE have generally been considered satisfactory for their intended purpose, there is still a need in the art for improved methods and systems to determine QoE when encryption, such as TLS encryption, is used by media services. The present disclosure provides a solution for these problems.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a method for analyzing media traffic having encrypted application-layer and payload data. The method includes determining from network traffic a media service provided to a network subscriber, application-layer and payload data of the network traffic providing the media service to the network subscriber being encrypted, detecting media traffic within the network traffic providing the media service to the network subscriber, associating application-layer data of the media traffic to a media session, determining a key performance indicator (KPI) associated with the media session, and outputting report data based on the KPI.

In accordance with another aspect of the disclosure, a system is provided for analyzing media traffic having encrypted application-layer and payload data. The system includes a memory configured to store instructions and a processor disposed in communication with the memory. The processor upon execution of the instructions is configured to determine from network traffic a media service provided to a network subscriber, application-layer and payload data of the network traffic providing the media service to the network subscriber being encrypted, detect media traffic within the network traffic providing the media service to the network subscriber, determine a media session that includes data of the media traffic, and report information associated with the media session, wherein at least one of determining the media service, detecting the media traffic, and determining the media session is based on information included in at least one of unencrypted data included in the network traffic and characteristics of the network traffic.

In accordance with still another aspect of the disclosure, a non-transitory computer readable storage medium and one or more computer programs embedded therein are provided. The computer programs include instructions, which when executed by a computer system, cause the computer system to determine from network traffic a media service provided to a network subscriber, application-layer and payload data of the network traffic providing the media service to the network subscriber being encrypted, detect media traffic within the network traffic providing the media service to the network subscriber, detect one or more media interactions in the media traffic, classify the one or more media interactions based on at least one of characteristics of the media interactions and unencrypted data to or from the network subscriber, analyze the one or more media interactions, and output report data based on the analysis.

BRIEF DESCRIPTION OF THE DRAWINGS

The accompanying appendices and/or drawings illustrate various non limiting, example, inventive aspects in accordance with the present disclosure.

DETAILED DESCRIPTION OF CERTAIN EMBODIMENTS

Many media (video and/or audio) services have the potential to provide significant new revenue streams for content and broadband service providers. However, mobile and fixed broadband service providers face the challenge of satisfying subscriber expectations while managing the growing volume of data traffic on their networks. Quality of experience measurements play an important role to the service providers to gauge subscriber satisfaction, limit subscriber churn, provide input and feedback for traffic control to maximize QoE and/or equalize QoE across multiple subscribers, and influence decisions to improve networks. However, when the media services employ encryption, such as transport layer security (TLS), QoE can become impossible or difficult to measure, endangering a service provider's ability to gauge, preserve, or enhance QoE.

Figure 1:
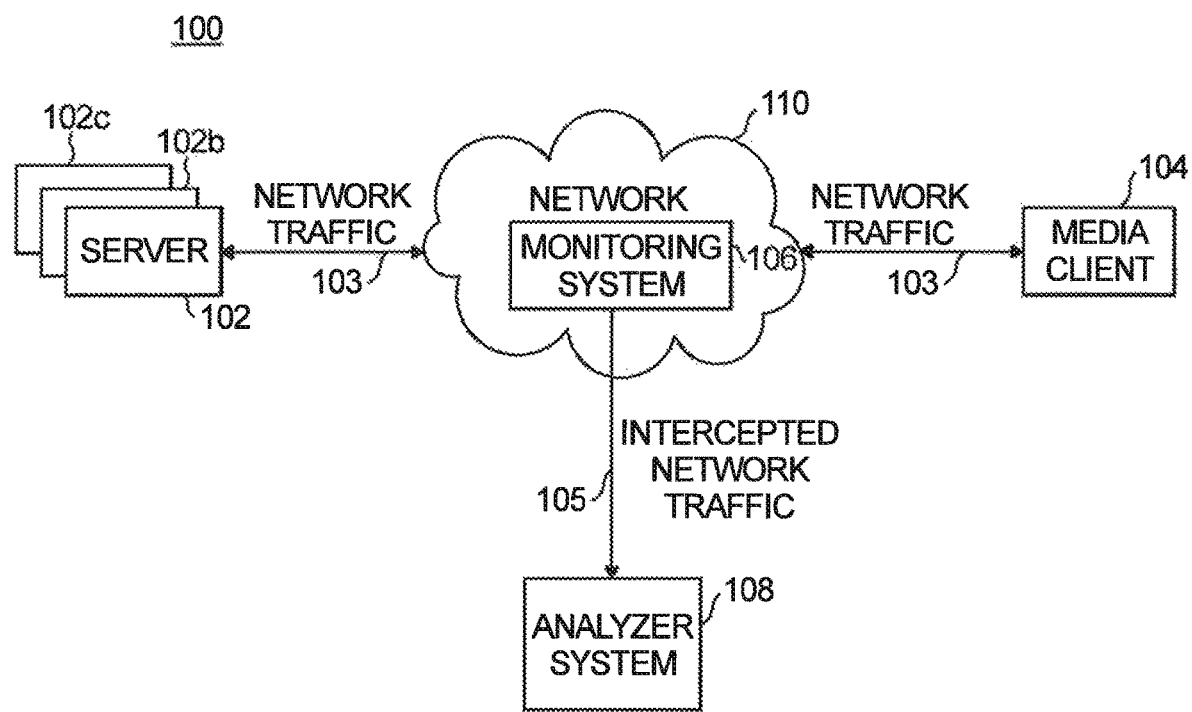
FIG. 1 illustrates a block diagram of an example network system in accordance with an illustrative embodiment of the present disclosure.

Reference will now be made to the drawings wherein like reference numerals identify similar structural features or aspects of the subject disclosure. For purposes of explanation and illustration, and not limitation, a block diagram of an exemplary embodiment of a network system in accordance with the disclosure is shown in FIG. 1 and is designated generally by reference character 100. Other embodiments of the network system in accordance with the disclosure, or aspects thereof, are provided in FIGS. 2-9 as will be described.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described. All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present disclosure is not entitled to antedate such publication by virtue of prior disclosure. Further, the dates of publication provided may differ from the actual publication dates which may need to be independently confirmed.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Description of certain illustrated embodiments of the present disclosure will now be provided. With reference now to FIG. 1, a block diagram of an exemplary network system 100 is generally shown. The network system 100 illustrates an example of a high level overview of an implementation of an embodiment of the disclosure. The network system 100 generally comprises one or more servers 102, one or more media clients 104, a network monitoring system 106, an analyzer system 108, a network 110, and an analysis storage module 112.

The server(s) 102 include one or more media servers 102a capable of offering and delivering media content (e.g., a media stream in a streaming media session or other media) to one or more media clients 104 via the network 110. The server(s) 102 can further include one or more non-media servers 102b. The media client(s) each include one or more devices used by a subscriber that subscribes to or uses media services provided by the media server(s) 102a for receiving media content delivered by the media server(s) 102a. Each of the devices can be, for example, a cellular phone, a smart phone, a personal digital assistant, a desktop or laptop computer, a tablet, or other user device capable of media processing, distribution, or playback.

The network 110 may be implemented as a delivery network comprising numerous and/or interconnected hardware and/or software systems through which streaming media travels. A media stream may be offered and/or delivered to one or more of the media clients 104 and monitored by the network monitoring system 106. Network traffic exchanged between the server(s) 102 and the media client(s) 104 flows via one or more data paths 103. The network traffic can include, for example, streaming audio and/or video media from the media server(s) 102a; requests and responses exchanged between the server(s) 102 and the media client(s) 104; other non-media traffic exchanged between the server(s) 102 and the media client(s) 104, such as web-pages, voice data, images, emails, textual data (e.g., Tweets®), graphical data (e.g., emoticons), etc.

The monitoring system 106 intercepts the network traffic. The intercepted network traffic is provided to the analyzer system 108 via data path(s) 105. The analyzer system 108 analyzes the intercepted network traffic and outputs a report of the analysis, which can include an estimation of QoE.

The monitoring system 106 and analyzer system 108 may be implemented in hardware, software or a combination of hardware and/or software. In one example, the monitoring system 106 may monitor traffic in Internet Protocol (IP) networks of network 110. However, the particular type of network may be varied to meet the design criteria of a particular implementation. While the monitoring system 106 is shown connected to the network 110, the monitoring system 106 may include one or more devices connected directly at the server(s) 102 and/or the media client(s) 104, and/or the monitoring device may include one or more virtual monitoring devices.

The monitoring system 106 may include one or more monitoring devices (not shown) that inspect packets on network interfaces of network 110 being monitored. The monitoring devices may be incorporated into an "in-line" device between server(s) 102 and media client(s) 104. For example, a monitoring device may be a router or deep-packet inspection device, or a module incorporated into a router or deep-packet inspection device.

In an embodiment of the present disclosure, the monitoring devices can intercept network traffic via a passive tap that is used to split and replicate traffic directly from a network link, such as wired or wireless links between server(s) 102 and the media client(s) 104, which can include links to or from or external to a core network (e.g., a SGSN, RNC, and/or GGSN, without limitation to a particular cellular technology) of a cell provider, or links between the core network and a packet data network. This approach offers a non-intrusive method for replicating the data packets of the network traffic.

In an alternative configuration, one or more of the monitoring devices can intercept data via a port mirroring function of Ethernet switches or routers to replicate the packet data of the network traffic. In this approach, subscriber and internet IP address masks can be specified in order for the analyzer system 108 to determine the direction of the traffic where it was intercepted.

One or more of the monitoring devices can include a 1 Gb/s 1000BaseT interface module to interface with a wide range of either copper or optical links at a variety of different link data rates. Further, one or more of the monitoring devices can be compatible with 802.11Q VLAN trunking.

The monitoring devices can provide intercepted streaming data to the analyzer system 108 via one or more ports (not shown) of the analyzer system 108 that can be configured as either upstream or downstream ports, depending on the feed from the monitoring system 106 (e.g., a passive tap) that indicates the direction of the data through the monitored network link.

U.S. Pat. No. 9,032,427, assigned to Netscout Systems of Westford Mass., the contents of which are incorporated herein by reference in its entirety provides greater details regarding monitoring devices that monitor network traffic at network links and extraction of various types of data by a monitoring system and an analyzer.

The analyzer system 108 processes the encrypted data included in the intercepted network traffic associated with a media service provided by a media server 102a to a media client 104 by analyzing encrypted and unencrypted data exchanged with the media server 102a and/or other servers 102. The analyzer system 108 can analyze, for example, unencrypted metadata, unencrypted user and control plane data, unencrypted header information, characteristics of the encrypted and/or unencrypted data, such as timing information about the encrypted or unencrypted traffic to and/or from the device of the media client 104 in connection with the media service. The timing information can include, for example, timing of transmission of individual packets and acknowledgement of receipt of the packets or responses. Unencrypted data can be obtained before encryption is used or concurrently while encryption is being used. Additionally, the analyzer system 108 can further process the intercepted network traffic by performing analysis using apriori knowledge, statistics about aggregated data, and/or results of previous analyses.

In general, the analyzer system 108 can process intercepted network traffic to: determine a media service provided by a media server 102 that uses encryption; process unencrypted data in the network traffic to detect media traffic directed to specific network subscribers using devices of media clients 104 that is associated with the media service; associate application-layer data of the media traffic associated with a particular subscriber and the media service to a media segment that includes one or more media sessions (e.g., contiguous sessions) or a portion of a media session; determine a streaming protocol used for the media segment; identify one or more interactions (also referred to as media interactions) as defined below, in the media segment; determine a media type of the one or more respective interactions; determine an amount of media transmitted in streams of the one or more interactions; determine presentation quality for the one or more interactions or portions thereof; estimate intervals of playback of the one or more respective interactions; estimate impairments to QoE based on the timing and size of one or more respective interactions; determine a key performance indicator (KPI) associated with delivery of the one or more interactions; determine a quality level of the media delivered in the one or more interactions; determine various KPIs and statistics associated with the one or more interactions; and output report data based on one or more of the analyses. Since application layer and content information in the data packets is encrypted, these tasks are performed without performing deep packet analysis and without access to the application-layer or payload data.

It is noted that since the media service uses encrypted data that cannot be accessed, determinations are made based on estimations, which may further be based on inferences. For example, estimations and/or inferences are used for determination of the media service, the streaming protocol, the media type, the amount of media transmitted, the presentation quality, intervals of playback, impairments to QoE, the KPIs, and quality level of the media. Accordingly, although the term "determine" may be used, it is understood that this determination is based on estimation and/or inference.

U.S. Pat. Nos. 9,178,633; 9,032,427; 9,037,743; and 9,458,298, all assigned to Netscout Systems of Westford Mass., the contents all of which are incorporated herein by reference in their entirety for all purposes, provide greater details regarding processing of intercepted network traffic, the value of estimating QoE of media sessions, definitions of types of QoE, including session QoE, presentation QoE, and delivery QoE, and methods of determining the different types of QoE.

U.S. Pat. No. 9,032,427, having been incorporated by reference in its entirety for all purposes, provides greater details regarding processing packet data and network and media session data to obtain media site identification data that identifies a media site supplying video content in a media session, information pertaining to a user device that receives video content in the media session, such as a device category and/or a device operating system (OS) of the user device, and total media session duration as authored, both streamed and viewed duration of the particular media session for the specific session.

Figure 2:
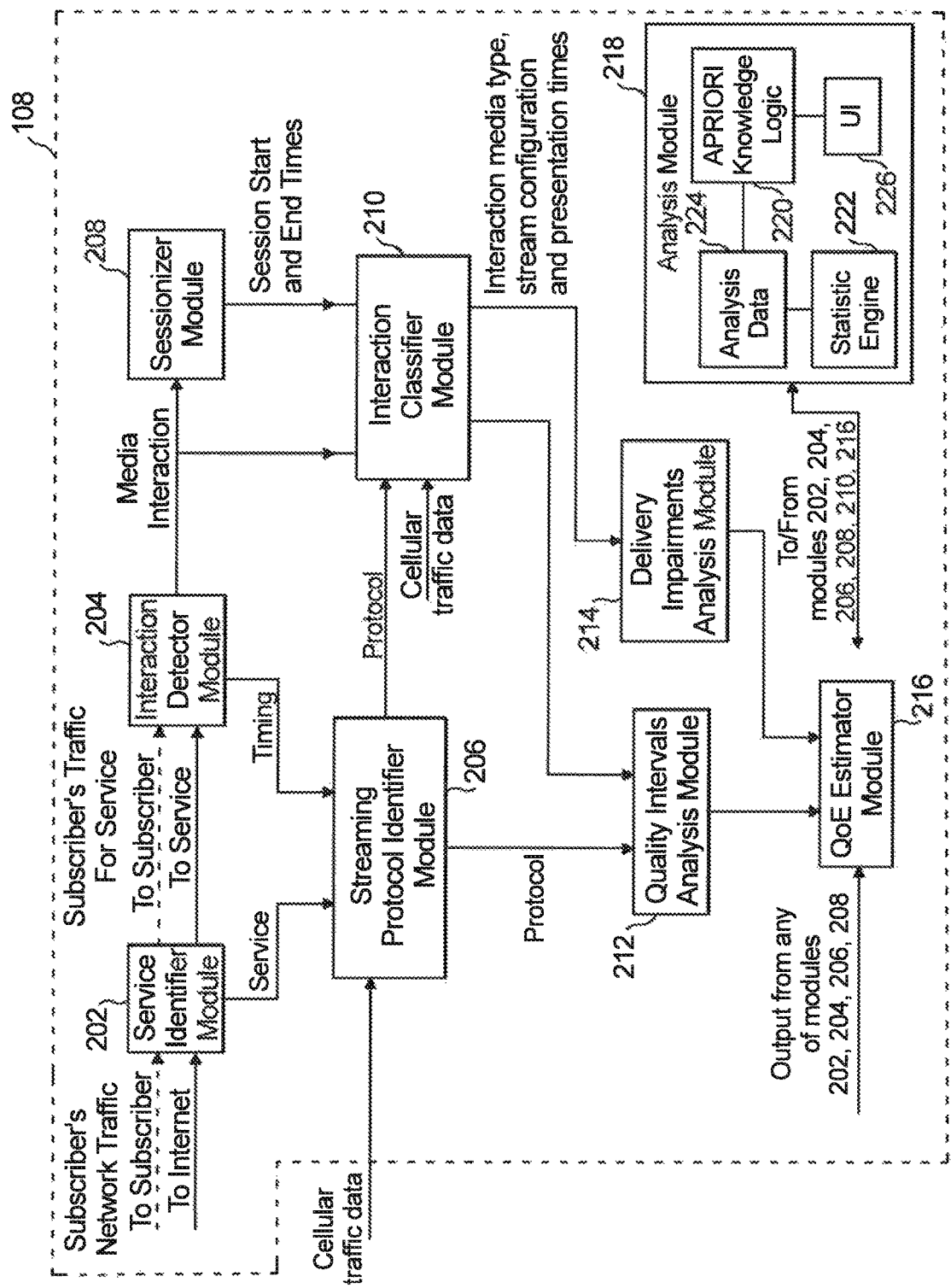
FIG. 2 illustrates a block diagram of an analyzer system of a network system in accordance with an illustrative embodiment of the present disclosure.

U.S. Pat. No. 9,032,427, having been incorporated by reference in its entirety for all purposes, provides greater details regarding collecting and correlating network and media session data to aggregate data over a plurality of media sessions to permit in-depth analysis of the network and media session data. With reference now to FIG. 2, a block diagram of at least a portion of the analyzer system 108 is shown. Intercepted network traffic, including subscriber network traffic having an encrypted flow associated with a particular subscriber is provided to service identifier module 102. The subscriber network traffic received by the analyzer system 108 includes data to the subscriber and data to the Internet. Assignment of packets of the intercepted network traffic to traffic flows as performed by the analyzer system 108 is described in greater detail in U.S. Pat. No. 9,032,427, having been incorporated by reference in its entirety for all purposes.

At least a portion of the application-layer data and the payload data of the data flows of the intercepted network traffic is encrypted. Once intercepted, the encrypted and non-encrypted network traffic is grouped by subscriber, such as by a network analyzer that separates traffic for each subscriber connection based on inspection of client IP address and possibly other information from the network control plane (e.g. GTP-C fields, such as the IMEI).

The analyzer system 108 includes a service identifier module 202, an interaction detector module 204, a streaming protocol identifier module 206, a sessionizer module 208, an interaction classifier module 210, a quality intervals analysis module 212, a delivery impairments analysis module 214, and a QoE estimator module 216. Information can be shared between each of the modules 202-216, regardless of whether a data path is shown in FIG. 2. Furthermore, each of the modules 202-216 can access information from the subscriber's network traffic as needed, regardless of whether a data path is shown in FIG. 2.

The modules 202-216 can be implemented in one or more computing devices, each computing device having a processor to execute each corresponding of modules 202-216. The modules 202-216 can be implemented in software, hardware, firmware, or a combination thereof. The modules 202-216 can be separate and distinct from one another or any of modules 202-216 can be combined or share components.

The service identifier module 202 receives the subscriber's network traffic of the intercepted streaming media for a particular subscriber and determines whether the subscriber's network traffic includes a media flow, and if so, identifies the media service used.

Analysis module 218 includes a statistic engine 222 that can receive data output by any of modules 202, 204, 206, 208, 210, and 216, for example and without limitation. Statistic engine 222 can aggregate the data output by any of modules 202, 204, 206, 208, 210, and/or 216, perform statistical analysis on the aggregated data, and store the results of the aggregation and/or statistical analysis in the analysis data 224. The analysis data 224 can be accessed by any of modules 202, 204, 206, 208, 210, and 216 to perform their respective operations.

Additionally, analysis module 218 includes apriori knowledge logic 220 that can use logic based on knowledge about media services, streaming protocols, media interactions, and/or QoE estimation to assist with identification of a media service, identification of a streaming protocol, identification of media interactions; classification of media interactions; and/or estimation of QoE. A user interface (UI) 226 of the analysis module 218 interfaces with a user input device, such as a keyboard, pointing device, or touch screen via which an operator can enter configuration data to configure the apriori knowledge logic 220.

I. Media Service Determination

The service identifier module 202 detects data in the subscriber network traffic that is a media flow, and which media service (e.g. YouTube, Netflix, Facebook) the data in the media flow is associated with. Depending on the information available in the subscriber network traffic that is not encrypted, a determination whether a network traffic flow in the intercepted network traffic includes a media flow that represents media traffic, and, if so, identification of a media service with which the media flow is associated can be made by at least one of:

Inspecting metadata and headers that are unencrypted and available in traffic layers below the encrypted application layer, such as transport and network layers.

One example of unencrypted, available metadata, without limitation to this particular example, is the Server Name Indication (SNI) field which can be sent during a transport layer security (TLS) handshake. The TLS handshake refers to a communication that initiates an encrypted TLS session between a media client 104 and a media server 102. A hostname requested by an application executed by on the media client 104 that is initiating the connection can be determined from a value of this field. Based on the hostname, the flow can be identified as a media flow and associated with a particular media service and media service session.

Another example, without limitation to the particular example, is using the IP address of the media server 102 to look up registrant information for IP addresses in a public database, such as the WHOIS database made available by the Internet Corporation for Assigned Names and Numbers (ICANN), to determine an organization that owns the IP address and determine the media service based on this organization.

Using information from other flows of the subscriber's network traffic to associate the encrypted media flow with a media service and a media session.

One example of other flows, without limitation to this particular example, includes flows using Domain Name System (DNS) interactions by a media client 104 associated with the subscriber that are initiated before (e.g., immediately before) or concurrently with the encrypted media flow to determine the media service session based upon domain name lookups that were performed by the media client 104.

Another example, without limitation to this particular example, is accessing metadata from headers (e.g., hostname or "User-Agent" field) for unencrypted application-layer (e.g., HTTP) interactions initiated prior to or concurrently with the encrypted traffic in order to associate the encrypted flow with a media service session or to help to identify the device type, operating system of the media client 104 associated with the subscriber, and/or application software used by the media client 104 or media server 102.

The service identifier module 202 can filter the subscriber's network traffic for the media service identified as being used, and can further provide the filtered traffic as subscriber's traffic for the identified media service, including media traffic to the subscriber and media traffic to a service provider of the media service.

II. Streaming Protocol Identification

The streaming protocol identifier module 206 can determine the streaming protocol being used. The streaming protocol identifier module 206 can receive the subscriber network traffic and/or information from other modules, such as identification of the media service used and/or information about the device of the media client 104 associated with the subscriber from the service identifier module 202, and/or information about timing, frequency and/or sizes of interactions of the media session from the interaction detector module 204. Alternatively, the streaming protocol identifier module 206 can determine information about the media service used, the device of the media client 104 associated with the subscriber, and/or interactions of the media session.

The term "media interaction" is defined herein to be network traffic associated with a request for data from a client and a response determined or inferred to correspond to the request from a server. For encrypted traffic, the determination of which data of the network traffic is a request and which data is a response that corresponds to the request can be inferred, such as based on timing, size of packets, etc., as described further below. The term media interaction can include pipelined protocols, such as HTTP/2 or QUIC associated with one or more inferred or determined request/response pair.

The streaming protocol can be identified based on the identification of the media service used and knowledge about the media service and/or the device of the media client 104 associated with the subscriber (e.g., the device's operating system). If not received from other modules of the analyzer system 108, the streaming protocol identifier module 206 can identify the media service or determine information about the device using cellular network control data traffic (e.g., GTP) information and/or unencrypted subscriber traffic generated from the device (e.g., as provided in an HTTP User-Agent field). In embodiments, the streaming protocol identifier module 206 can determine the streaming protocol using inferences based on characteristics of the media session (e.g., frequency, timing, and/or sizes of the interactions) and/or the media service and the device OS.

The streaming protocol identifier module 206 can access the analysis data 224 for stored knowledge about streaming protocols as related to characteristics of the identified media service, the device and its operating systems, and/or information about interactions within a media session. This prior knowledge can be used to determine the streaming protocol used.

III. Interaction Detection

The interaction detector module 204 detects media interactions (also referred to as interactions) within the subscriber's traffic for the media service identified by the service identifier module 202 and outputs the detected media interactions to the sessionizer module 208 as media interaction data. The interaction detection includes detecting boundaries of application-layer interactions within the encrypted media flows of the subscriber's traffic for the identified media service. Since most media payload is delivered via a request-response protocol, boundary detection can be accomplished by tracking upstream (media client to media server) and downstream (media server-to-media client) data at the application layer after having removed control traffic related to an encryption protocol being used.

Figure 3:
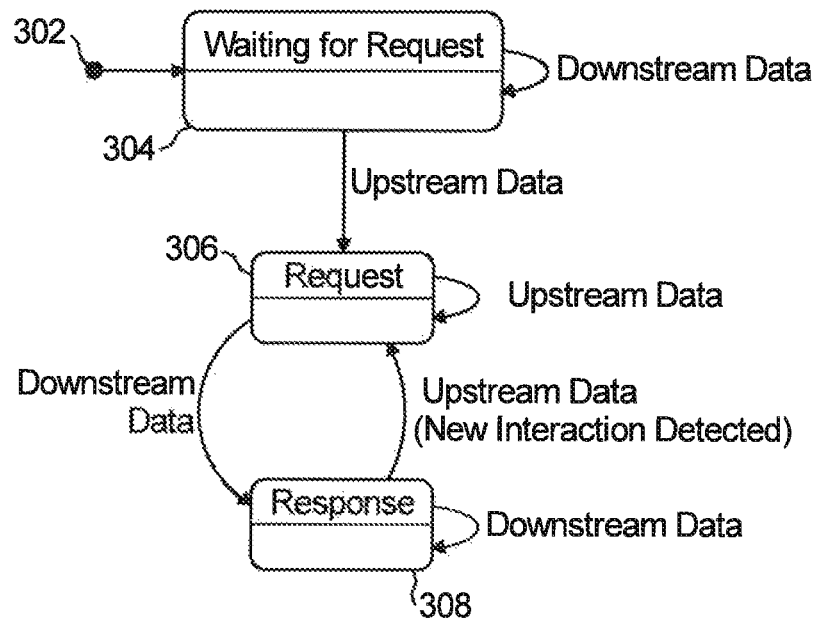
FIG. 3 illustrates a flow diagram of a state machine of the analyzer system shown in FIG. 2.

FIG. 3 shows a flow diagram of an example state machine 300 that can be included in the interaction detector module 204 to detect interaction boundaries for network traffic that uses synchronous request-response protocols, such as non-pipelined HTTP. The subscriber's upstream and downstream traffic for the identified media service is received at operation 302. At wait state 304, a wait operation is performed to wait for receipt of a request in the upstream data from the media client 104. The state does not change upon receipt of downstream data. When a request is received in the upstream data the state changes to request state 306 until a response is received in the downstream data. While in request state 306 the state does not change upon receipt of upstream data. When a response is received, the state changes to response state 308 until a next request is received in the upstream data, indicating that a new interaction is detected. While in the response state 308 the state does not change upon receipt of downstream data.

The interaction detector module 204 can classify packets of network traffic that use asynchronous or pipelined request-response protocols. The interaction detector module 204 can use one or more characteristics of the data to classify data packets or portions of data packets of the subscriber's traffic for the identified media service as belonging to a particular request-response interaction. These characteristics include, for example:

Timing of request and response data packets of the subscriber's traffic for the identified media service, including time between request and response packets and time between consecutive response packets Respective sizes of the request and response data packets Information from other flows of the subscriber's network traffic concurrent to transfer of the data packets in the subscriber's traffic for the identified media service, which can be accessed from the subscriber's network traffic, such as non-media traffic to the subscriber that can give a hint as to the state of the device of the media client 104 from which can be inferred information about the start/end of an interaction (for example, flows of traffic directed back to the media server (e.g., YouTube servers) that are collecting statistics from the media client 104's device Other metadata included with the subscriber's traffic for the identified media service, including unencrypted data used for encrypted protocol establishment (e.g., protocol negotiation messages, upgrade commands from an unencrypted protocol to an encrypted protocol)

Application of apriori knowledge logic 220 that is based on prior knowledge and can help identify a streaming protocol based on implementation by a media client 104, such as how the media client requests segments of a media session (e.g., whether the media client 104 requests audio and video together or separately) or how much playback time is included in respective requested segments.

IV. Sessionization

The sessionizer module 208 receives media interaction data output by the interaction detector module 204 and performs sessionization. The sessionization estimates a media session, including assigning media traffic between a subscriber and a media service (service session traffic) to individual media sessions. Sessionization allows estimated QoE values and related KPIs to be computed for individual media sessions (viewings of single clips or combinations of clips or a portion of a clip).

Once the end or start time of a media session is determined, application-layer data having an associated time that falls between the start and end time of the media session is associated to the media segment. The associated time can be, for example, a time at which a packet that includes the application-layer data was observed, sent, or received.

In the sessionization process, start times of media sessions are estimated by determining which interactions mark the start of a media session. To make this decision, groups of temporally-related interactions (called "time slices") are classified as either "session start" or "not session start". When an interaction that is newly classified as "session start" is detected using the algorithm described with reference to FIG. 3, then the last interaction before the interaction classified as "session start" is determined to be the end of the previous session, if there does exist a previous session. By framing the sessionizing problem as one of classification, common machine classification techniques can be applied.

Once the time slices have been labeled as session start or not, the interactions are ascribed to media sessions such that the start time of each "session start" time slice marks the start of a new media session.

IV.1 Grouping Interactions into Time Slices

The sessionizer 208 analyzes time slices at a time during which the time slice's interactions are active. By grouping media interactions into logical units, windows of time can be determined during which media interactions are active. These time windows define times during which media sessions could have potentially started.

The following is a description of an example algorithm executed by the sessionizer 208 for grouping interactions into time slices.

Input

Media and metadata interactions for a single media service session over a period of time, received from the interaction detector module 204

Output

A list of time slices consisting of one or more media interactions

Determining the Start of a Time Slice

In the above pseudocode, the StartOfTimeSlice function may have various embodiments, depending on various factors, including device, media client, media service, and the streaming protocol. This implementation may use any of the following information:

Aggregate data about interactions in the media session, collected across the entire media session or inside some temporal window Metadata about the interaction under consideration (e.g. start time, TLS Server Name Indication (SNI), total bytes, etc.)

In embodiments, the StartOfTimeSlice function includes computing the time during a quiet interval, wherein the quiet interval is defined as the time between a start time of the current interaction and a start time of the latest start time of all previous interactions. If the quiet interval exceeds a first predetermined threshold (e.g., two seconds), then the StartOfTimeSlice function determines that the interaction is the start of a new time slice.

Figure 4:
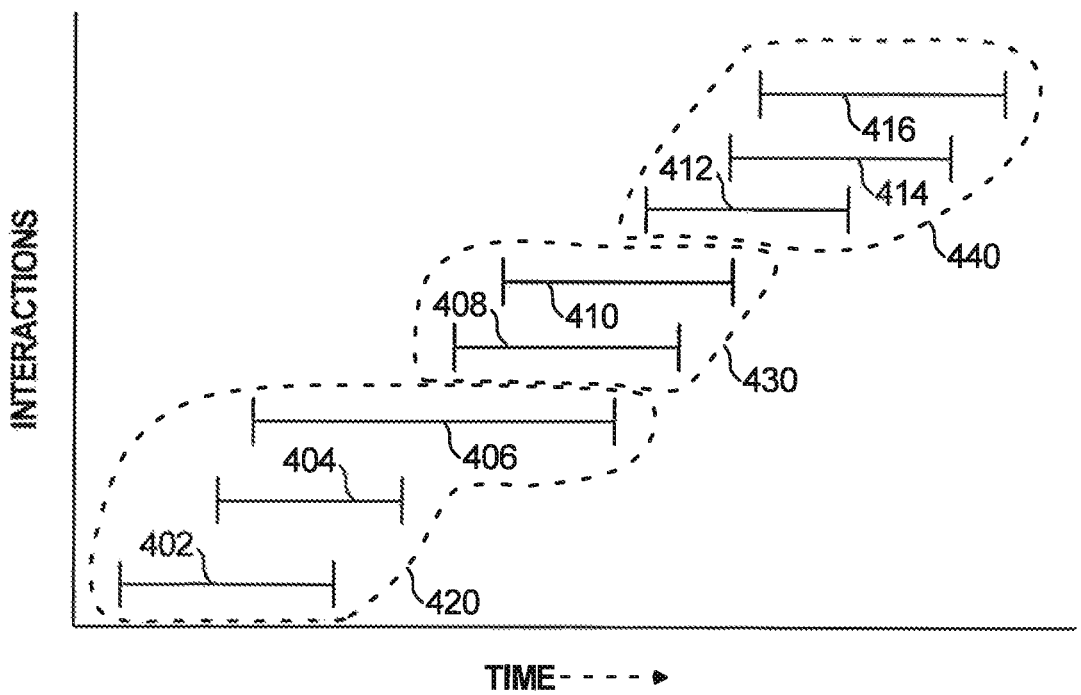
FIG. 4 illustrates a plot of interactions in a subscriber's network traffic for a media service plotted over time based on start and end times of the interactions and grouped into time slices in accordance with an illustrative embodiment of the present disclosure.

With reference to FIG. 4, a plot 400 is shown of a plurality of interactions plotted in sequence, with the horizontal axis representing time and the vertical axis representing the sequence of the interactions. Each interaction is represented as a bounded horizontal line, with the leftmost bound giving the interaction's start time, and the rightmost bound giving the interaction's end time. The first 3 interactions 402, 404, and 406 are all grouped in to slice 420 because the differences between their start times do not exceed the quiet interval threshold. However, the time between the start of the third interaction 406 and the fourth interaction 408 exceeds this threshold. Hence the fourth interaction 406 starts a new slice 430. The difference between the start times of the fourth interaction 408 and the fifth interaction 410 is less than the quiet interval, forming slice 430. A gap larger than the quiet interval exists between the start times of the fifth interaction 410 and the sixth interaction 412, resulting in the sixth interaction 412 being considered the start of slice 440. Slice 440 includes interactions 412, 414, and 416, since the difference between their start times is less than the quiet interval.

Another embodiment of this function may compute the quiet interval between interactions whose associated metadata (e.g., SNI) indicates that they are manifest interactions. When the quiet interval between manifest interactions exceeds some threshold, then the function determines that the interaction is the start of a new time slice.

IV.2 Coarse Time Slice Classifier

The sessionizer module 208 can further apply coarse-grained manual classification, using reasoning and observation about the time slices.

Input

Media time slices

Output

A labeling of the input media time slices as either "session start", "not session start," or "undetermined"

Algorithm

If the media traffic inactivity period (period of no media traffic between slices) is greater than a second predetermined threshold (e.g., five minutes) or the media time slice is the first time slice for that subscriber or media service, then mark that time slice as "session start"

If the number of flows containing media traffic that start within a media time slice is less than a third predetermined threshold (e.g., two media flows), then mark that time slice as "not session start"

If the media traffic inactivity period is greater than a fourth predetermined threshold that is smaller than the second or third predetermined thresholds (e.g., 30 seconds) then mark that time slice as "session start"

IV.3 Time Slice Machine Classifier

The sessionizer module 308 can further be trained to classify time slices using a machine learning classification algorithm to determine a set of coefficients that can be used to classify each media time slice as either "session start" or "not session start".

Input

Media time slices that were not classified by the Coarse Time Slice Classifier

Precomputed coefficients of a linear function that maps a set of time slice features (i.e., time slice attributes or values computed from time slice attributes) to a "session start"/"not session start" classification Output A labeling of all of the input media time slices as either "session start" or "not session start"

Algorithm

For each media time slice, apply the linear function with the precomputed coefficients to the set of time slice features. If the resulting value is greater than zero, the media time slice receives a "session start" label; otherwise, it receives a "not session start" label.

V. QoE Estimation

Although the contents of the application-layer payload are opaque due to encryption, an estimation of the QoE of a media session can still be derived from KPIs associated with observable characteristics of the media session traffic, such as the timing of delivery of individual bytes/packets of data, amount of bytes/packets delivered, bit rate, quality level, etc., and statistics that can be derived from this. The vast majority of encrypted media traffic on packet networks is served from a small number of major media services (e.g., YouTube, Netflix). In order to determine the QoE estimation as accurately as possible for these major media services, a QoE estimation algorithm can take advantage of service-specific characteristics of the media traffic.

For these major media services, the vast majority of encrypted traffic is streamed using adaptive bit rate (ABR) streaming protocols. ABR protocols are designed to allow a media client and server to dynamically adapt a requested media bit rate mid-session to an available bandwidth on a connection being used, which assists in maximizing quality while preventing or minimizing stalls and playback delays. To allow this, multiple versions of each media (audio/video) track are available on the media server, each having a different media bit rate and corresponding level of quality.

In order to facilitate the ability to change the quality level of the audio and video tracks independently of one another, the audio and video tracks can be served in separate interactions. Specifically, a single interaction can consist of a request from a media client for a segment of audio or a segment of video, but not both. The term "segment," as used herein with respect to audio and video segments, refers to media associated with a single interaction, e.g., a request/response pair. In other cases, each interaction can consist of a request from a media client for a segment that contains both audio and video. Each segment can contain a small amount of presentation time (or playback time) of the respective track (or tracks). The duration of the segment determines how frequently a stream configuration switch can occur. Presentation time refers to an amount of time it would take to playback the segment, assuming no pauses, rewinds, etc. The duration of the media that has been downloaded. Playback time refers to the amount of time in which the media is actually played back, including pauses, rewinds, etc.

For a particular media server and protocol, each segment and each interaction contains a fixed amount of the presentation time of either audio or video portions of the media payload. In an example, when using a particular streaming protocol, each segment contains 10 seconds worth of video or 10 seconds worth of audio. In another example protocol, each segment contains 5 seconds worth of audio or 5 seconds worth of video. For other media servers and protocols, a fixed amount of presentation time for both the audio and video tracks may be contained in each segment.

Further, each media service serves media data at a respective quality level and bit rate. Some of these quality levels are encoded with constant bit rate (CBR) rate control, meaning that the average bit rate for each portion of a media track (e.g., audio or video data streamed at a specific media bit rate) remains approximately constant throughout a media track. Other quality levels may use variable bit rate (VBR) rate control, meaning the average bit rate for each portion of the media track is permitted to vary depending on complexity of encoding parts of content of the media data.

The interaction classifier module 210 can process the media interaction data output by the interaction detector module 204 using knowledge about the protocol identified, knowledge about the device of the media client 104, and/or timing information to classify the interactions. The timing information can include session start and end times determined by the sessionizer module 208. Alternatively to using session start and end times, the interaction classifier module 210 can classify the interactions using time intervals. Additionally, pre-determined knowledge about the media service identified can be used to classify the encrypted media interactions. The classification can include determining whether tracks in the media interaction are audio or video tracks, configuration used, quality level used, and amount of presentation time.

In embodiments, the interaction classifier module 210 can classify media interactions based on their size according to an example protocol, such as a protocol used by a specific media service, using available information about stream configuration (and associated format, bit rates, segment durations, and typical interaction sizes) as illustrated in the table below.

TABLE 1

Example of possible stream formats, durations and interaction signs for a specific media service and streaming protocol.

| Media Type | Format Notes | Average Bit Rate | Segment Duration | Typical Payload Bytes | Interaction Bytes |
|---|---|---|---|---|---|
| Audio | AAC Stereo, 44.1 kHz, CBR | 48 kbps | 10 s | 60000 | 59000-69000 |
| Audio | AAC Stereo, 44A kHz, CBR | 128 kbps | 10 s | 160000 | 160000-167000 |
| Video | 144p, CBR | 110 kbps | 10 s | 137000 | 135000-160000 |
| Video | 240p, CBR | 250 kbps | 10 s | 310000 | 315000-355000 |
| Video | 360p, VBR | 400 kbps | 10 s | varies | varies |
| Video | 480p, VBR | 750 kbps | 10 s | varies | varies |
| Video | 720p, VBR | 1400 kbps | 10 s | varies | varies |

In a specific example that illustrates operation of the interaction classifier module 210, for a session using this protocol that had a series of interactions that are approximately 61000 bytes that are concurrent with a series of interactions that are approximately 330000 bytes, the larger interactions would be classified as 240 p CBR video and the smaller interactions as 48 kbps AAC audio (each interaction containing 10 seconds of audio or video).

In some cases, a quality level Interaction Bytes ranges may overlap with one another. In those cases, the ambiguity may be resolved by one or more of the following.

Looking at audio quality levels first. Audio quality levels are generally constant bit rate, so the likelihood of positively identifying an audio quality level is higher than for video quality. High confidence in the audio quality helps determine the video quality level.

Preferring to detect the lowest audio quality out of the candidate audio qualities. Since the Interaction Bytes for audio tends to be smaller than the Interaction Bytes for video, detection will be more successful when we assume the lowest quality possible.

Preferring to detect non-overlapping qualities levels, since interactions in the non-overlapping ranges are unambiguous.

Looking at the ratio of audio to video interactions at the selected quality levels for the grouping of interactions being considered for detection. For uneven ratios (e.g., 25% video interactions to 75% audio interactions), refraining from considering combinations of quality levels.

For the VBR video quality levels, there are typical ranges of interaction sizes, and typical ratios of sizes between the different resolutions (e.g., the 480 p video bit rate is typically about 2 times the 360 p video bit rate; the 720 p video bit rate is typically 1.8 to 2.0 times the 480 p video bit rate). These statistics allow for the selected quality level and changes (stream configuration switches) between the various VBR video quality levels to be estimated.

Furthermore, knowing that each interaction contains a specific amount of presentation time provides information about the timeliness of the delivery of the media. This can be used to infer delays and stalls in media playback, which can have a significant impact on session QoE. This knowledge can also be used to estimate KPIs regarding media playback, such as the delay from the initial request until playback commences on the device.

Based on KPIs regarding available quality levels, and sizes, number, and timing of observed interactions, the media type (audio or video) and stream attributes (e.g., codec, format, bit rate, and quality level) can be estimated. The attributes are key properties of the media track (audio/video track) that determine the presentation quality. The term "format" refers to video resolution in the case of video, and audio sampling rate, in the case of audio. The algorithm executed by the interaction classifier module 210 detects quality level changes and estimates the amount of time streamed at each quality level. The above stream configurations and interaction sizes are examples only. Additional quality levels with different sizes (and possibly segment durations) exist.

Moreover, a single media service may have different ABR protocols that are supported, each with its own associated stream configuration and segment duration. Other media services may only support a single streaming protocol, stream configuration, and/or stream duration.

The classification of interactions as belonging to a particular media type (audio/video) and stream configuration may make use of apriori knowledge logic 218 of that is based on knowledge about the streaming protocol.

Additionally, as shown in FIG. 2, timing information output by the interaction detector module 204 can be provided to the streaming protocol identifier 206. The streaming protocol identifier can infer the streaming protocol based on characteristics of the media traffic (e.g., frequency and timing of interactions with specific sizes).

Further, inferences can be made about the visual complexity of the content of a media session, and the effect that this complexity has on visual quality, based on observable variance in the interaction sizes. For example, a VBR video track that has very little variability in size from one interaction to the next is typically very simple content (still, low complexity) that can be encoded with high quality at a relatively low bit rate. On the contrary, a track with very high variability between interactions is likely to be content that has higher visual complexity, and may require a higher bit rate to achieve high visual quality in its encoding. The observations may apply to the entire media session on average, or to different parts or scenes within the media session. That is, some scenes may be identified as having lower complexity, and others as having higher complexity, which can be used as part of the overall quality estimation algorithm.

To summarize how a session QoE score is computed for a media session:

Based on the sizes of interactions, an amount of media associated with each stream configuration (e.g., format, bit rate, and/or quality, or combination thereof), is determined, including when switches occur to a different stream configuration. The presentation quality for each time interval between stream configuration switches is estimated based on the streams' properties e.g., formats and bit rates, and properties of the interaction sizes (e.g. variability of interaction sizes)

A time-weighted average of the presentation qualities for each quality level is computed The amount of playback delay and stalling is estimated based on the timeliness of the media delivery (e.g., amount of presentation time delivered relative to the playback time)

Figure 5:
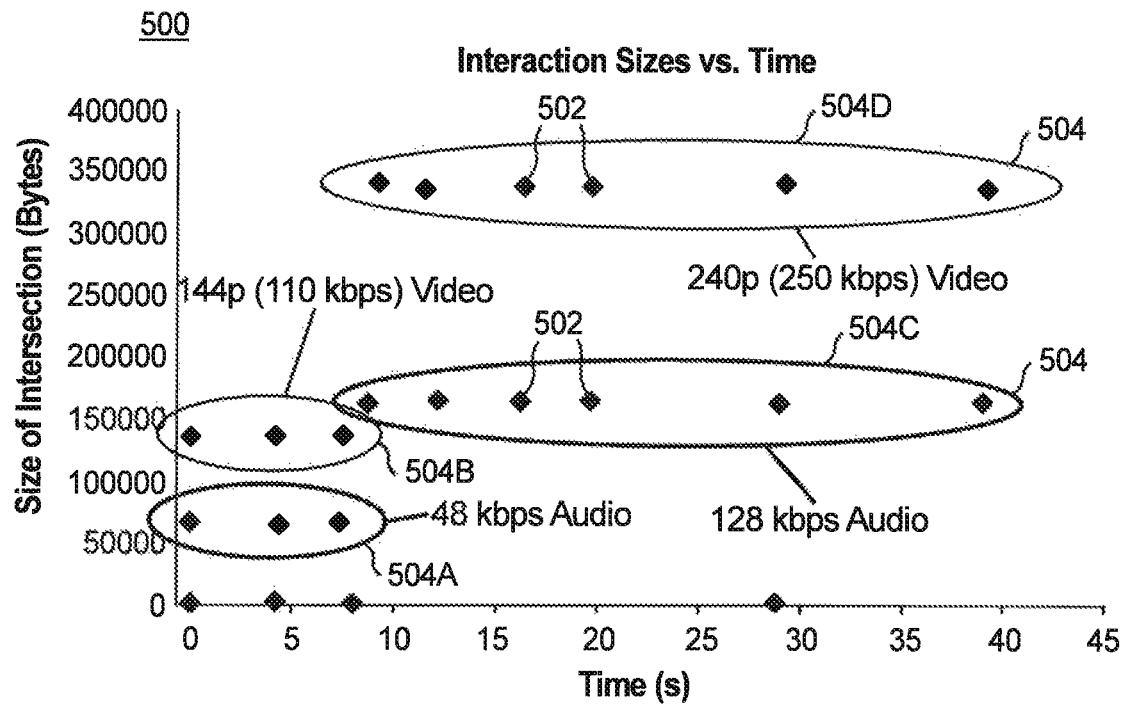
FIG. 5 illustrates a plot of interaction sizes versus time associated with a subscriber's network traffic for a media service in accordance with an illustrative embodiment of the present disclosure.

One or more of these factors can be used and/or combined to estimate the complete user experience and determine a session QoE for the media session V.1 Example of Determining Session QoE for Encrypted Media FIG. 5 shows an example plot 500 of a series of interactions 502 belonging to a media session for the example media service and streaming protocol described in Table 1. The horizontal axis represents real world time and the vertical axis represents the size of an interaction, measured in bytes. In this example, the points representing interactions 502 represent the end time of the corresponding interaction, wherein the end time refers to a time at which the entire response has arrived at the media client.

In the first 8 seconds of the media session, there are a series of three interactions 504A of approximately 66 KB as well as three interactions 504B of approximately 140 KB. Referring to Table 1, it can be noted that 66 KB interactions are likely to be 48 kbps AAC audio, and that 140 KB interactions are likely to be 144 p (110 kbps) video. Each of these interactions contains 10 seconds of presentation time for their respective media stream.

There are some much smaller interactions 504E (approximately 2 KB) that are typically non-media metadata, and are ignored in the analysis of the QoE.

From approximately 9 seconds until the end of the session, there are 2 different ranges of interaction sizes: the smaller interactions are in the range 165-167 KB, and the larger ones are 335-340 KB. Referring to Table 1 for available streams, the smaller interactions are likely to be 128 kbps AAC audio, and the large interactions are likely to be 240 p (250 kbps) video. There are six of each of these interactions (each with a presentation time of 10 s).

The analysis of the above interaction can be summarized into the following intervals of playback, with each interval representing a specific set of streams and respective qualities:

Interval 1: 30 seconds of 144 p video with 48 kbps audio

Interval 2: 60 seconds of 240 p video with 128 kbps audio.

It may be assumed that the entire 30 seconds of Interval 1 was played/viewed by the subscriber, followed by the entire 60 seconds of Interval 2. Alternately, it may be assumed that some of the interactions from Interval 1 were never played, in favor of the higher-quality streams of Interval 2.

Using the first assumption, all of the media delivered for each Interval is played back in its entirety, the following table summarizes the session, including estimates of the QoE for each audio/video stream within an Interval, and a total presentation QoE for each Interval, based on the stream QoE values. Note that the Presentation QoE refers to the QoE when considering only the quality of the presented media (e.g., video resolution, fidelity, quantization, etc.) without taking KPIs regarding delivery impairments (e.g., stalls) into account. U.S. Pat. No. 9,037,743, having been incorporated by reference in its entirety for all purposes, describes the concept of Presentation QoE in greater detail.

TABLE 2

| Interval | Total Playback Duration | Streams | Stream QoE | Interval Presentation QoE |
|---|---|---|---|---|
| 1 | 30 seconds | 48 kbps AAC audio | 4.0 | 3.2 |
|   |   | 144p, 110 kbps, H.264 video | 3.0 |   |
| 2 | 60 seconds | 128 kbps | 4.5 | 3.8 |
|   |   | 240p, 250 kbps, H.264 video | 3.5 |   |

The individual stream QoE values are estimated based on subjective analysis of the quality provided for the particular media service and protocol. These QoE values may take in to account factors such as the estimated media bit rate for the stream and/or the estimated complexity of the content, which may be inferred from the specific sizes of the interactions and the variability of the sizes of the interactions within a single stream.

The Interval Presentation QoE is based on the individual QoEs of the component streams, and again is computed by a model that is based on analysis of subjective results.

An overall media session QoE can be computed based on the individual Interval QoE values. In one example of a calculation for overall media session QoE, the Interval QoE can be weighted based only on the presentation time for each Interval, as shown in example Equation (1).

$$\text{Quality Intervals } QoE = \frac{\sum_i \text{Playback Duration}_i \times QoE_i}{\sum_i \text{Playback Duration}_i} \quad \text{Equation (1)}$$

$$\text{Quality Intervals } QoE = \frac{\sum_i \text{Playback Duration}_i \times QoE_i}{\sum_i \text{Playback Duration}_i}$$

In an example applying the information in Table 2 to Equation (1):

Quality Intervals QoE=(30×3.2+60×3.8)/(30+60)= (324)/(90)=3.6

To compute a QoE for the entire session, KPIs regarding impairments to the QoE that are due to late delivery of media, such as long startup delays or mid-session stalls, are estimated and taken into account.

Delivery impairments analysis module 214 uses the number, size, time and type (such as determined by the interaction classifier module 210) of the interactions to estimate KPIs, such as an amount of playback delay and stalling based on timeliness of media delivery (e.g., an amount of presentation time delivered relative to a playback time).

Delivery impairments analysis module 214 estimates an impact of delivery impairments by computing the Delivery Ratio, which is the ratio of presentation time to total (actual, real-world) time for the session. Delivery Ratio can be calculated using example Equation (2):

$$\text{Delivery Ratio} = \frac{\text{Total Playback Duration}}{\text{Total Session Time}} \quad \text{Equation (2)}$$

The delivery impairments analysis module 214 can infer and quantify impairments due to delivery timing issues, such as stalls and delays.

In the example shown in FIG. 5, the total playback duration is 90 seconds and the session time can be estimated from FIG. 5 to be approximately 39 seconds (the time in which the last interaction completes). Thus, 90 seconds worth of media is delivered in 39 seconds, which appears to provide few or no delivery-related impairments to the QoE. The delivery ratio in this case is 2.3.

In an alternative example, if the 90 seconds of media were delivered over a period of 120 seconds, the delivery ratio would be 0.75. This lower delivery ratio implies that the user would have likely observed stall in playback, because the media is being delivered slower than real-time.

Figure 6:
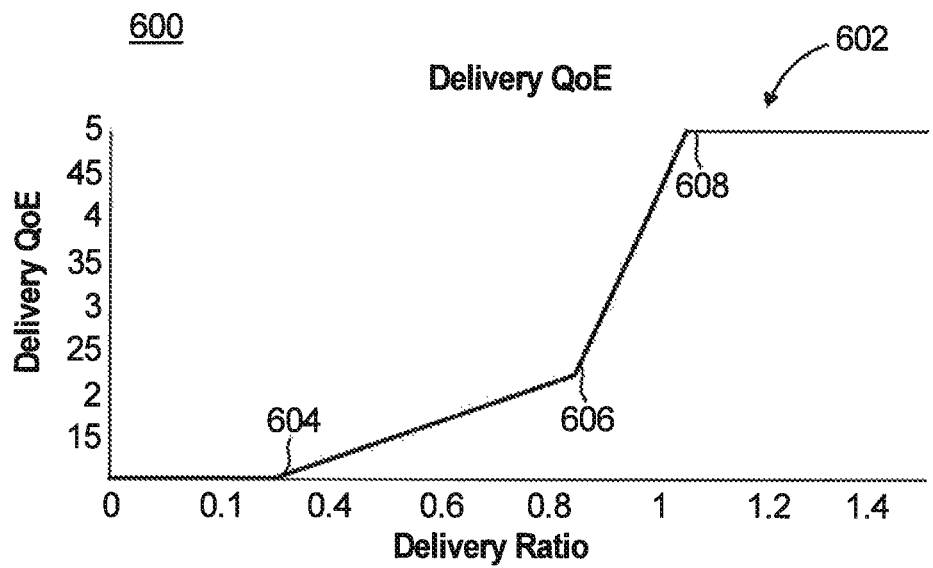
FIG. 6 illustrates a plot of deliver quality of experience with delivery ratio plotted over delivery QoE in accordance with an illustrative embodiment of the disclosure.

The delivery ratio may also be computed over time intervals that are less than the total duration of the session—for example, every 10 seconds of real world time, or over each Quality Interval. Impairment due to the delivery ratio could then be applied to the Interval QoE scores prior to integration via Equation (1). Additionally, delivery ratio can be a KPI reported alongside QoE for the session (S-QoE) and provide additional insight into the QoE score and how it was achieved. With reference to FIG. 6, a plot 600 of delivery QoE based on delivery ratio is illustrated. The horizontal axis represents delivery ratio and the vertical axis represents delivery QoE. A curve 602 is plotted, wherein delivery ratios that are significantly below 1.0, such as between points 604 and 606 and between the origin and point 604, result in poor QoE. Delivery ratios that are above 1, such as beginning at about point 508 result in very good QoE, as the media is delivered on time and therefore the QoE is not reduced.

Alternative methods of computing and applying the Delivery QoE are possible. The quality intervals analysis module 212 uses the number, size, time and type (as determined by the interaction classifier module 210) of the media interactions, and determines KPIs such as intervals having similar presentation quality. In this way, the quality intervals analysis module 212 can detect when a switch occurs to a different stream configuration (or level of presentation quality) and output an intervals of time spent at each stream configuration, The QoE can be computed for each of these intervals, after which a final, time-weighted average is computed for the session.

For example, the quality intervals analysis module 212 can apply the Delivery QoE individually to each Quality Interval as part of the Interval QoE. In another alternative, the quality intervals analysis module 212 can continually estimate a KPI such as a buffer state of the client in order to estimate specific times of playback and stalls. Estimating the buffer state can include incrementing a measure of data stored in the buffer as interactions arrive and decremented the measure of data stored in the buffer as playback is modeled. The buffer temporarily stores media that has arrived at the media client 104, but has not been played back yet. The buffered media is stored in the buffer until it is played back, at which point it can be discarded to make room in the buffer for a next part of a download. Thus, as content is played back, the amount of data in the buffer is reduced.

Estimation of the buffer state is described in greater detail in U.S. Pat. Nos. 9,178,633 and 9,485,298, both applications having been incorporated by reference in their entirety for all purposes.

In embodiments, the QoE estimation module 216 can estimate QoE for an entire session based on a combination of an impact of delivery impairments due to delivery timing determined by the deliver impairments analysis module 214 and intervals of time spent at each stream configuration and associated Quality Intervals QoE determined by the quality intervals analysis module 212.

V.3 Alternate Method of Computing Session QoE

The QoE estimation module 216 can also estimate QoE for a session using an example parametric equation shown in Equation (3):

$$f(\text{quality, delivery } KPI) = \begin{cases} g_1(deliveryKPI), \text{quality} = 1 \\ g_2(deliveryKPI), \text{quality} = 2 \\ \vdots \\ g_n(deliveryKPI), \text{quality} = n \end{cases} \quad \text{Equation (3)}$$

where quality can be indicated by KPIs such as a CBR video resolution (e.g., 144 p), a VBR bit rate (e.g., 400 kbps), or some other indicator of the quality level; and delivery KPI (Key Performance Indicator) is some indicator or set of indicators that describe the session's delivery quality (e.g., Delivery QoE or delivery ratio). The result of this function $f$ in Equation (3) can determine the QoE for the session.

Figure 7:
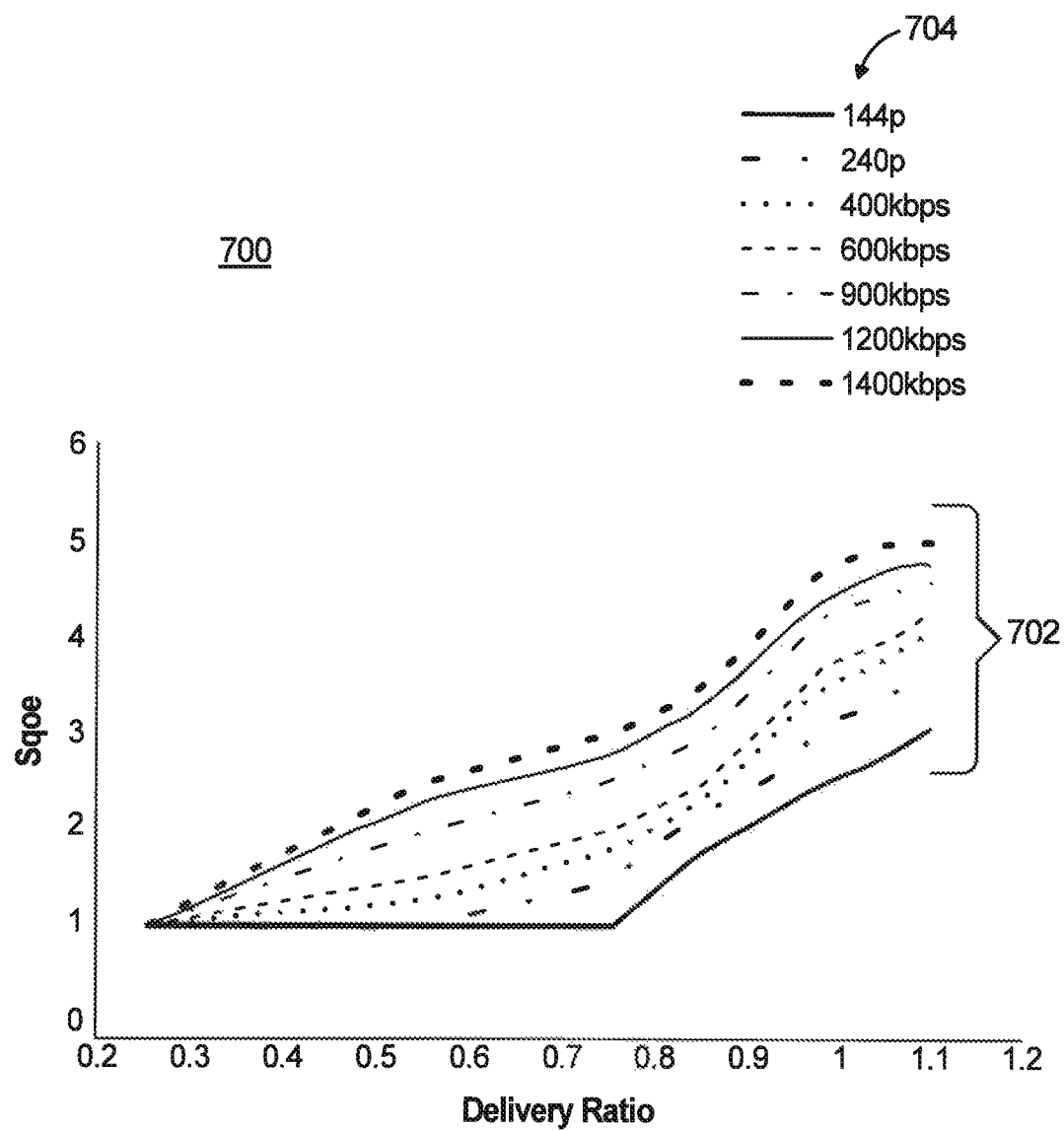
FIG. 7 illustrates a plot of a variety of quality levels associated with a subscriber's media interactions associated with a subscriber's network traffic for a media service with delivery ratio plotted over session quality of experience in accordance with an illustrative embodiment of the present disclosure.

With reference to FIG. 7, an example plot 700 in which a plurality of curves 702 are plotted for a variety of quality levels associated with a subscriber's media interactions classified in example bins of: 144 p CBR, 240 p CBR, 400 kbps VBR, 600 kbps VBR, 900 kbps VBR, 1200 kbps VBR, 1400 kbps VBR, as designated by key 704, by applying Equation (3). The horizontal axis represents delivery ratio, which is used as a delivery KPI. The vertical axis represents session QoE (Sqoe). Additionally, a combining function can be applied to determine an overall session QoE, such as the Quality Intervals QoE function of Equation (1) and as demonstrated in the ensuing example using Equation (1).

Figure 8A:
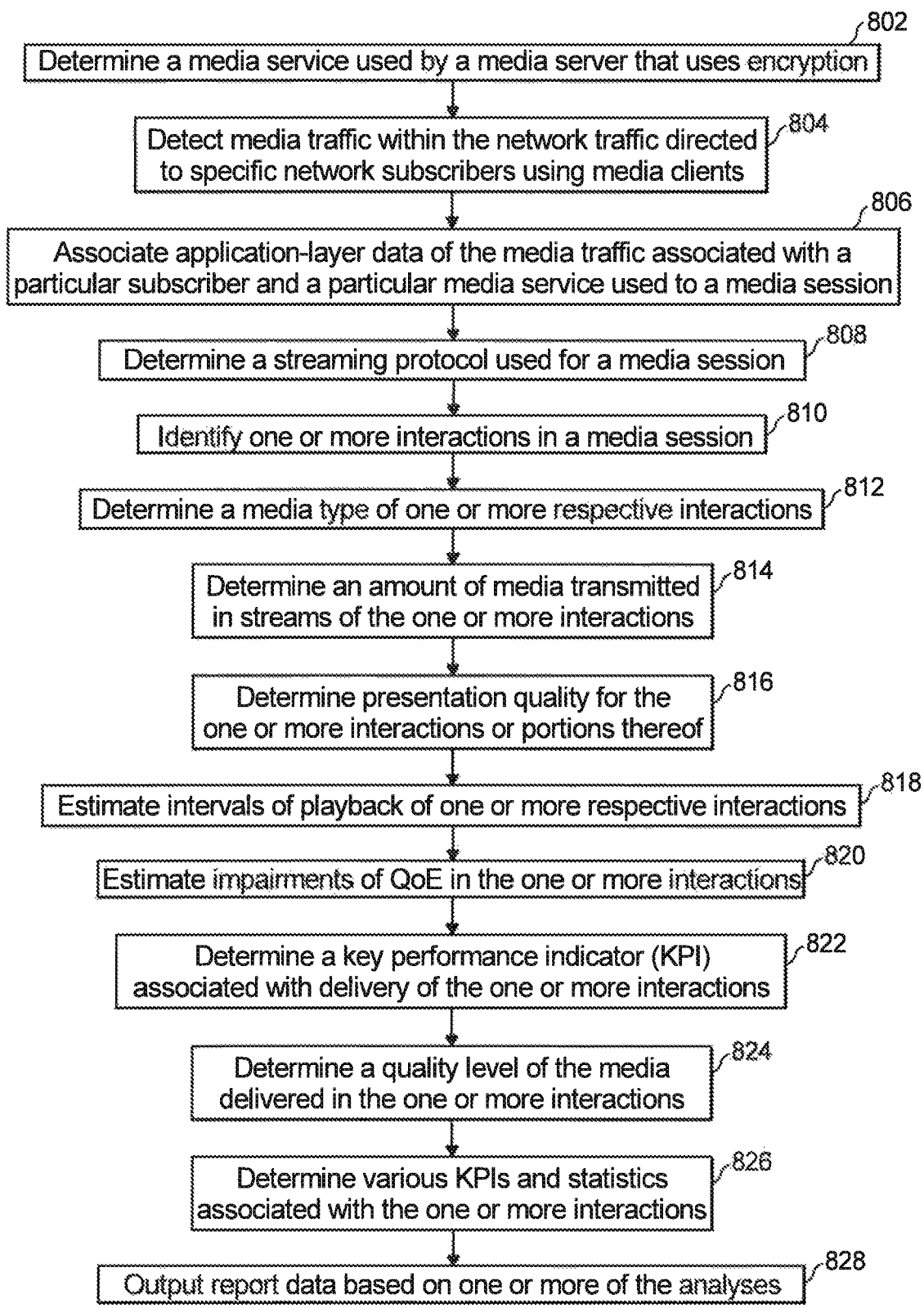
FIG. 8A illustrates a flowchart of an example method of the disclosure for analyzing media traffic in accordance with an illustrative embodiment of the present disclosure.
Figure 8B:
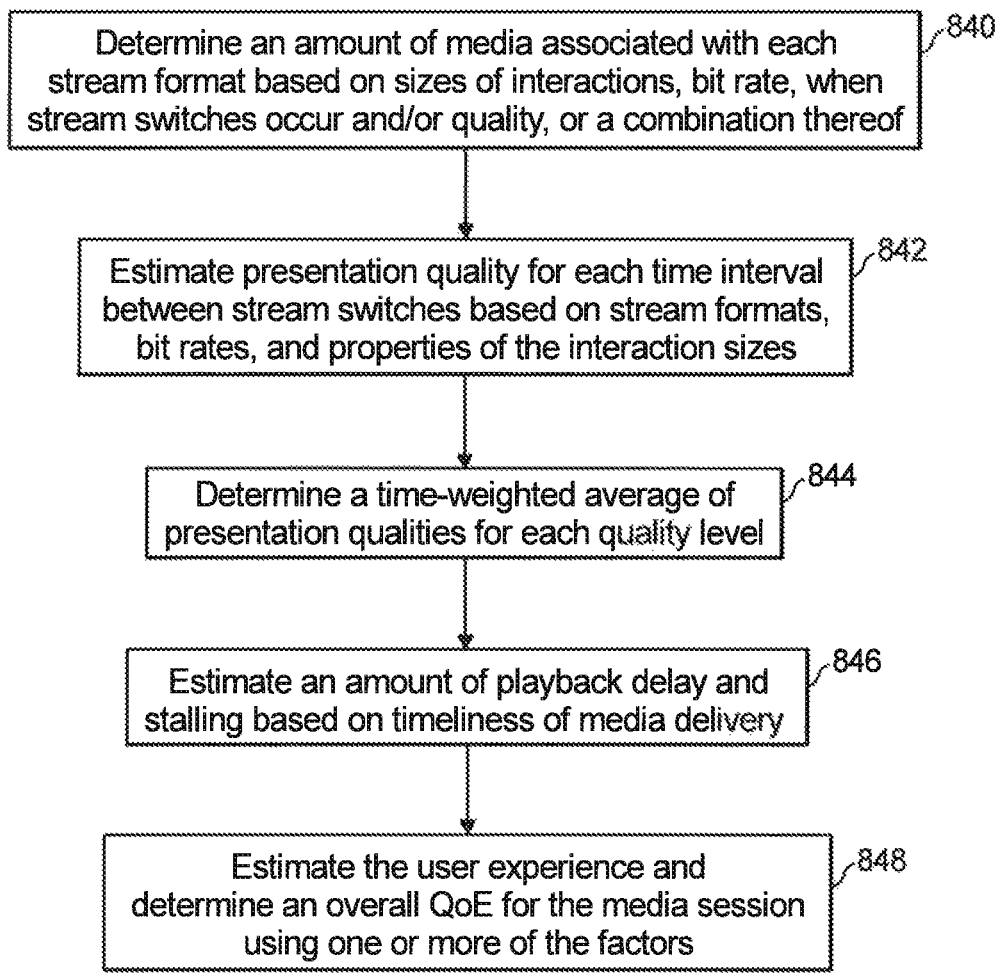
FIG. 8B illustrates a flowchart of an example method for determining quality of experience associated with a subscriber's network traffic for a media service in accordance with an illustrative embodiment of the present disclosure.

FIGS. 8A and 8B are flowcharts of the disclosed methods in accordance with exemplary embodiments of the present disclosure. The methods can be performed by an analyzer system, such as analyzer system 108 shown in FIG. 2. Before turning to description of FIGS. 8A and 8B, it is noted that the flowcharts in FIGS. 8A and 8B show examples in which operations are carried out in a particular order, as indicated by the lines connecting the blocks, but the various operations shown in this diagram can be performed in any order, or in any combination or sub-combination. It should be appreciated that in some embodiments some of the operations described below may be combined into a single operation. In some embodiments, one or more additional operations may be included.

With reference to FIG. 8A, network data having encrypted data in the application layer and payload is accessed. Unencrypted data of the network data can also be accessed. Accessing the encrypted and/or unencrypted data can include observing characteristics of the data. At operation 802, a media service provided by a media server 102 that uses encryption is determined. The determination is an estimation that can be based on, for example, unencrypted and available data and/or characteristics of encrypted or unencrypted data. At operation 804, media traffic within the network traffic directed to specific network subscribers using associated media clients is detected, such as by separating traffic for each subscriber connection based on inspection of the client IP address and possibly other information from the network control plane (e.g., GTP-C fields, such as the IMEI).

At operation 806, application-layer data of the media traffic associated with a particular subscriber and a particular media service provided is associated to a media session. At operation 808, a streaming protocol used for the media session is determined. At operation 810, one or more interactions in the media session are identified. At operation 812, a media type of the one or more of the respective interactions is determined. At operation 814, an amount of media transmitted in streams of the one or more interactions is determined. At operation 816, a presentation quality for the one or more interactions or portions thereof is determined. At operation 818, intervals of playback of the one or more respective interactions are estimated. At operation 820, impairments of QoE in the one or more interactions are estimated. At operation 822, one or more KPIs associated with delivery of the one or more interactions is determined. At operation 824, a quality level of the media delivered in the one or more interactions is determined. At operation 826, various KPIs and statistics associated with the one or more interactions are determined. At operation 828, report data based on one or more of the analyses is output.

Operations 806-826 can be optional operations. Any combination of operations 806 and 826 can be included in the method described, and the modules that perform the operations can share information for implementation of each operation.

With reference to FIG. 8B, at operation 840, an amount of media associated with each stream configuration is determined based on, for example, detected sizes of interactions, bit rate, quality, and/or occurrence of stream configuration switches. At operation 842, presentation quality for each time interval between stream configuration switches is estimated based on stream configuration and properties of the interaction sizes. At operation 844, a time-weighted average of presentation qualities for each quality level is determined. At operation 846, an amount of playback delay and stalling is estimated based on timeliness of media delivery. Timeliness of media delivery can include, for example, amount of presentation time delivered relative to playback time. At operation 848, a complete user experience is estimated and/or a session QoE for the media session is determined.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
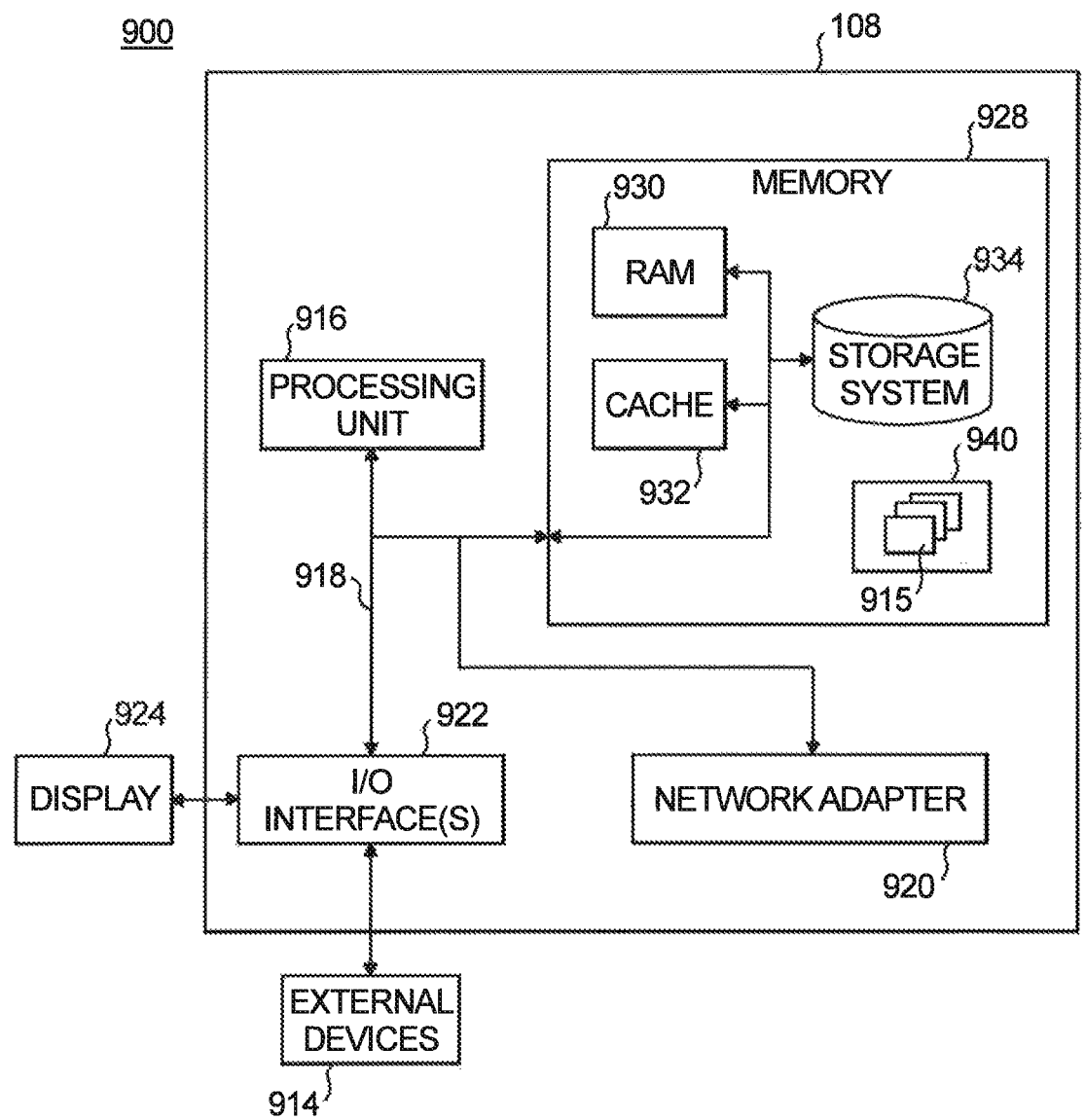
FIG. 9 illustrates a schematic block diagram of an example packet monitor or packet analysis system, in accordance with an illustrative embodiment of the present disclosure.

Embodiments of the disclosure may be implemented or executed by analyzer system 108 embodied in one or more computer systems. One such computer system 900 is illustrated in FIG. 9. In various embodiments, computer system 900 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 900 is only one example of a suitable system and is not intended to suggest any limitation as to the scope of use or functionality of embodiments of the disclosure described herein. Regardless, computer system 900 is capable of being implemented and/or performing any of the functionality set forth hereinabove.

Computer system 900 may be described in the general context of computer system-executable instructions, such as program modules, being executed by a computer system. Generally, program modules may include routines, programs, objects, components, logic, data structures, and so on that perform particular tasks or implement particular abstract data types. Computer system 900 may be practiced in distributed data processing environments where tasks are performed by remote processing devices that are linked through a communications network. In a distributed data processing environment, program modules may be located in both local and remote computer system storage media including memory storage devices.

Computer system 900 is shown in FIG. 9 in the form of a general-purpose computing device. The components of computer system 900 may include, but are not limited to, one or more processors or processing units 916, a system memory 928, and a bus 918 that couples various system components including system memory 928 to processor 916.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 900 typically includes a variety of computer system readable media. Such media may be any available media that is accessible by network management server 104, and it includes both volatile and non-volatile media, removable and non-removable media.

System memory 928 can include computer system readable media in the form of volatile memory, such as random access memory (RAM) 930 and/or cache memory 932. Computer system 900 may further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. As will be further depicted and described below, memory 928 may include at least one program product having a set (e.g., at least one) of program modules that are configured to carry out the functions of embodiments of the disclosure.

Program/utility 940, having a set (at least one) of program modules 915, such as modules 202-216, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 915 generally carry out the functions and/or methodologies of embodiments of the disclosure as described herein.

Computer system 900 may also communicate with one or more external devices 914 such as a keyboard, a pointing device, a display 924, etc.; one or more devices that enable a user to interact with computer system 900; and/or any devices (e.g., network card, modem, etc.) that enable network management server 104 to communicate with one or more other computing devices. Such communication can occur via Input/Output (I/O) interfaces 922. Still yet, computer system 900 can communicate with one or more networks such as a local area network (LAN), a general wide area network (WAN), and/or a public network (e.g., the Internet) via network adapter 920. As depicted, network adapter 920 communicates with the other components of network management server 104 via bus 918. It should be understood that although not shown, other hardware and/or software components could be used in conjunction with computer system 900. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages of analyzing characteristics associated with encrypted network traffic and outputting reports about the analysis includes the ability to detect and correct problems that may affect a subscriber's quality of experience or quality of service delivered by a media server. Since encryption can hide information and interfere with the ability to detect and correct problems or assess quality of service or subscriber experience, the disclosed methods of utilizing available information to analyze a subscriber's network traffic provides transparency that can be otherwise occluded by the encryption.

With such transparency, KPIs can be generated and used to influence decisions for improving network operation and/or subscriber quality of experience. By understanding the subscriber's quality of experience subscriber, specific problems can be identified and addressed, improving subscriber satisfaction and reducing subscriber churn. Reliable quality of service provided by media service providers and service carriers can improve monetization for each of these entities. Network control mechanisms can be adjusted based on the detected problems, such as to equalize quality of experience for multiple users that share network resources.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

The invention claimed is:

1. A computer-implemented method to process encrypted network traffic comprising:
   intercepting, at an encrypted network application protocol layer, network traffic having network traffic flow associated with a subscriber;
   determining from the encrypted network application protocol layer in the intercepted network traffic a media service provided to a network subscriber, and encrypted application-layer and payload data of the network traffic providing the media service to the network subscriber;
   detecting media traffic within the network traffic providing the media service to the network subscriber;
   associating application-layer data of the media traffic to a media session;
   determining, at the encrypted network application protocol layer, a key performance indicator (KPI) associated with the media session from the intercepted network traffic; and
   outputting report data based on the KPI.

2. The computer-implemented method of claim 1, wherein at least one of the determining the media service, detecting the media traffic, and associating the application-layer data is based on information included in at least one of unencrypted data included in the network traffic and characteristics of the network traffic.

3. The computer-implemented method of claim 1, further comprising:
   determining a streaming protocol used for the media session; and
   analyzing the media session based on the streaming protocol used.

4. The computer-implemented method of claim 1,
   estimating boundaries of one or more respective media interactions in the media session;
   identifying network traffic of the media session within the estimated boundaries of the one or more respective media interactions, and
   analyzing the media session includes analysis of characteristics of the identified network traffic,
   wherein the KPI is determined based on the analysis.

5. The computer-implemented method of claim 4, further comprising estimating at least one of stream configuration and amount of presentation time for the at least one media interaction, wherein the KPI is determined based on at least one of the stream configuration and the amount of presentation time.

6. The computer-implemented method of claim 1, further comprising estimating the subscriber's quality of experience for the media session based on the KPI.

7. The computer-implemented method of claim 4, wherein the one or more media interactions is one of an individual non-pipelined interaction and a group of pipelined interactions.

8. The computer-implemented method of claim 4, further comprising determining a media type of the respective one or more media interactions, and wherein the KPI is further determined based on the media type of the respective one or more media interactions.

9. The computer-implemented method of claim 4, further estimating intervals of playback associated with the respective one or more media interactions, and wherein the characteristic is further determined based on the intervals of playback of the respective one or more media interactions.

10. The computer-implemented method of claim 4, further estimating impairments due to delivery timing of QoE of the respective one or more media interactions, and wherein the characteristic is further determined based on the impairments of QoE of the respective one or more media interactions.

11. The computer-implemented method of claim 4, wherein the KPI data represents a quality level of media included in payload data of the identified network traffic.

12. The computer implemented method of claim 11, further comprising:

determining an amount of time that the media included in the payload data of the identified network traffic is at a particular quality level; and estimating a QoE of the media session based on the amount of time determined.

13. A system for analyzing media traffic having encrypted application-layer and payload data, the system comprising:

a memory configured to store instructions;

a processor disposed in communication with the memory, wherein the processor upon execution of the instructions is configured to:

receive intercepted network traffic at an encrypted network application protocol layer having network traffic flow associated with a subscriber;

determine from the encrypted network application protocol layer in the intercepted network traffic a media service provided to a network subscriber, and encrypted application-layer and payload data of the network traffic providing the media service to the network subscriber;

detect media traffic within the network traffic providing the media service to the network subscriber;

associate application-layer data of the media traffic to a media session;

determine, at the encrypted network application protocol layer, a key performance indicator (KPI) associated with the media session from the intercepted network traffic; and output report data based on the KPI.

14. The system of claim 13, further comprising determining a streaming protocol used for the media session, wherein the analyzing the media session is performed based on the streaming protocol used.

15. The system of claim 13, wherein the processor, upon execution of the instructions, is further configured to:

estimate boundaries of one or more respective media interactions in the media session; and identify network traffic within the estimated boundaries of the one or more respective media interactions, wherein the analysis of the media session includes analysis of characteristics of the identified network traffic.

16. The system of claim 15, wherein the processor, upon execution of the instructions, is further configured to estimate at least one of stream configuration and amount of presentation time for the at least one media interaction, wherein the analysis of the media session is based on at least one of the stream configuration and the amount of presentation time.

17. The system of claim 15, wherein the processor, upon execution of the instructions, is further configured to estimate the subscriber's quality of experience for the media session based on the analysis of the media session.

* * * * *